(No Model.)
P. L. KIMBALL.
FLOAT FOR CREAMING CANS.
No. 469,149. Patented Feb. 16, 1892.
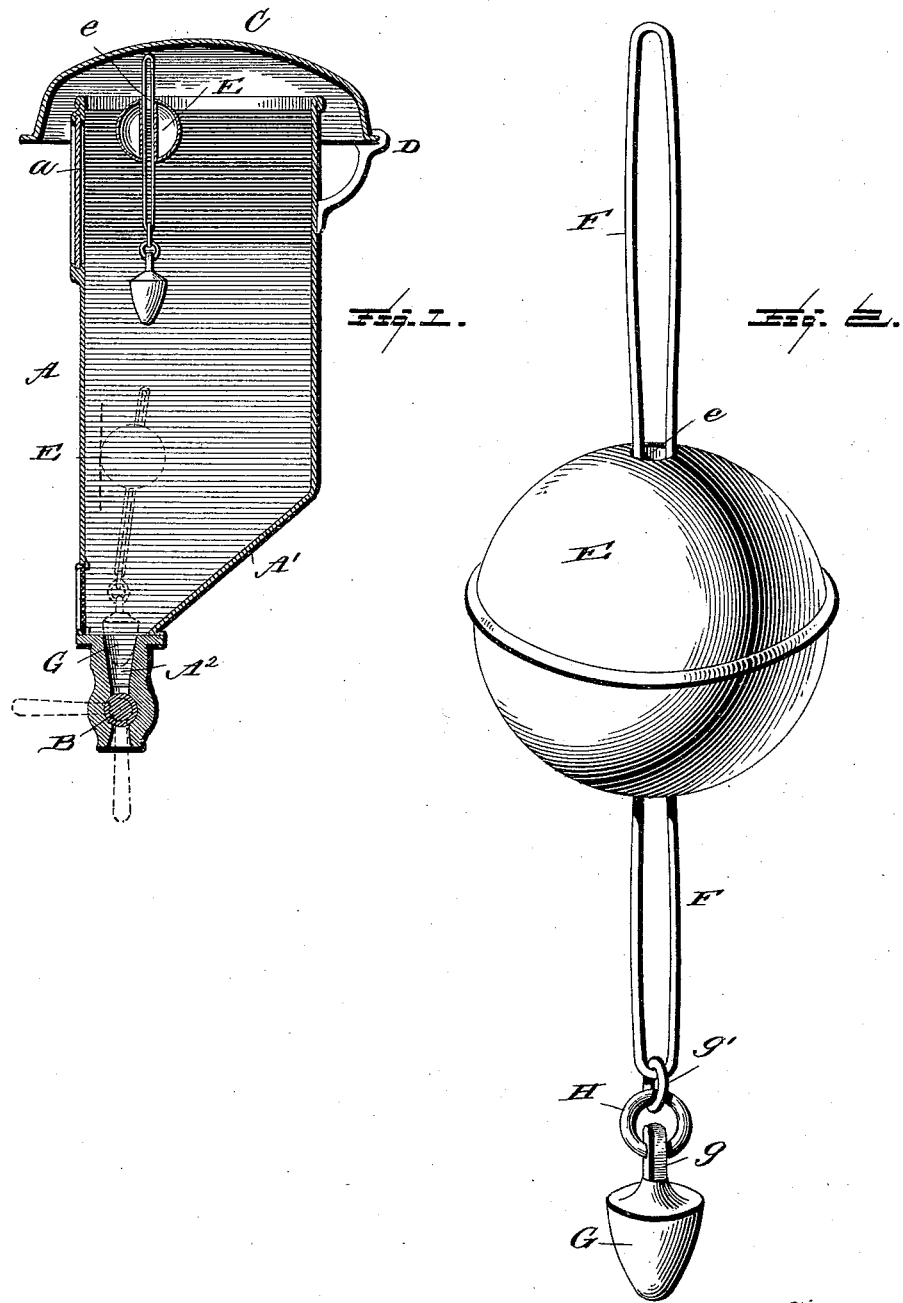
Witnesses
L. C. Hills.
E. H. Bond.
Inventor
Perley L. Kimball,
By E. B. Stocking
Attorney

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

FLOAT FOR CREAMING-CANS.

SPECIFICATION forming part of Letters Patent No. 469,149, dated February 16, 1892.

Application filed September 22, 1891. Serial No. 406,449. (No model.)

*To all whom it may concern:*

Be it known that I, PERLEY L. KIMBALL, a citizen of the United States, residing at Bellows Falls, in the county of Windham, State of Vermont, have invented certain new and useful Improvements in Cream-Separators, of which the following is a specification, reference being had therein to the accompanying drawings.

This invention relates to certain new and useful improvements in floats for cream-separators; and it has for its objects, among others, to provide an improved automatic cream-separator by which the cream may be readily separated from the milk, working as well in the dark as in the light, and which can be depended upon to work accurately. I provide a float or separator adapted for use in milk-setting cans, which float may be gaged on its support to suit the depth of the cream in the can, so that when the faucet or cock at the bottom of the can is opened to let out the skim-milk this float always follows the current, and the stopper, which is made in a shape to fit the opening in the faucet and carried loosely by the float, is drawn into the outlet and stops the outflow of the milk, leaving the cream in the can, from whence it can be drawn as desired. This operates of course after the cream has risen on the milk as it does in the gravity methods. The float is sleeved loosely upon a suitable support—as, for instance, a wire spring—from which is also loosely suspended the stopper, the float being so constructed as to float on the surface of cream, milk, or water, or in any liquid of about the same density. It is adjustable on its support, which support is entirely independent of the can, and this adjustment provides for the different thicknesses of cream, or to leave as little or as much milk as desired under the cream when the stopper stops the outflow. It is perhaps better to leave a little milk in with the cream than to run any of the cream out with the skim-milk. The float is not in the least effected by changes in temperature or difference in the consistency or specific gravity of the milk or cream, nor does hot water injure its efficiency. The can should preferably be provided with a glass panel, so that in using the float it can be readily seen that it works satisfactorily and the thickness of the cream can be easily determined, so as to properly adjust the float. An experienced person knows that the cream from a given herd in this method of setting averages about the same, so that when the float is once adjusted it does not need to be changed from time to time. If the can is provided with a lower glass panel, which is not, however, necessary, it shows whether the float is working accurately or not, but has no other function.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a vertical section through a can with my float and separator shown in its two positions. Fig. 2 is an enlarged perspective view of the float and its support and stopper removed.

Like letters of reference indicate like parts in both views.

Referring now to the details of the drawings by letter, A designates the creaming-can of the style known as the "cabinet," being formed with an inclined lower wall A' and a tapered outlet $A^2$, which is controlled by a cock or faucet B, which may be a two-way cock or any other preferred form or style. It is shown as designed for vertical delivery; but it may be otherwise. It may be provided with transparent panels $a$ at top and bottom or at the top only. These are provided for the purpose of ascertaining the height of the cream at the top and also for determining the proper adjustment of the float upon its support, and at the bottom for determining if the float has worked accurately and the cream has all passed out of the can. The upper transparent panel is deemed especially important in connection with my improved float-separator, as it enables one to easily ascertain the height of the cream and determine the proper adjustment of the float. The can here shown has a cover C, held a slight distance above the top of the can to provide ventilation and exclude dust and dirt. It is held in position by supports D; but this cover has no effect upon the working of the float or separator. It works equally as well whether the can is covered or not.

My improved separator consists of a float E, which may be of any suitable material, provided with a diametrical passage e, which is sealed from the interior of the float, and this float is adjustably carried by a wire holder F of proper length, formed with bends at each end; or, if preferred, the upper end may not be thus provided. It may be the two ends of the wire not united. This wire is passed through the vertical passage e of the float and is held in the desired position by frictional contact with the walls of the passage, the wire being sufficiently resilient to permit of ready adjustment of the float along the wire, and yet securely hold it in its adjusted positions thereon. While this float is shown in the form of a ball, it is to be understood that the invention is not confined to such shape, as it may be square, oval, or rectangular, or of other form.

G is the stopper, tapered to fit the outlet in the can, as seen by dotted lines in Fig. 1, and this stopper is provided with a stem or shank g, through a hole in which is passed the ring H, which is loosely connected with the lower end of the wire F in any suitable manner—as, for instance, by the ring g'. Other means of connection of these parts, however, may be resorted to so long as they are flexibly connected.

The displacement of the float is such and its weight relative to the specific gravity of the cream and milk is such as to cause it at all times to be borne by the cream. When thus supported, the stopper hangs loosely from the wire holder, as seen in Fig. 1 in full lines.

The operation will be readily understood, and, briefly stated, is as follows: The milk is placed in the can in the usual manner and allowed to stand until the cream has risen to the top, as indicated by the heavy lines in Fig. 1. The float is then placed in position, or it may be placed in position (the height on the wire being governed by experience as to the usual depth of the cream) when the milk is set in the can, so that when the skimming time arrives there is nothing to do but open the faucet and let the milk run out and the cream remain therein. This makes the skimming, as will be observed, entirely automatic. When the cock or faucet is turned to allow the skim-milk to flow out, the stopper settles with the descent of the milk and cream and stops the outflow of the cream and retains the same within the can, the adjustment of the float having been such as to permit all of the milk, or nearly all, to pass out before the stopper seats itself in its seat, as seen in Fig. 1 by dotted lines. The receptacle into which the skim-milk was drawn may now be removed and another substituted, when the attendant taking hold of the upper end of the wire holder lifts upon it and permits the cream to flow out.

In case the outlet is substantially in line with the wall of the can, as indicated by dotted lines in Fig. 1, the float will strike thereagainst, as seen in dotted lines, the flexible connection of the wire holder with the stopper permitting it to assume this or any other required position.

The float is made so strong and substantial that it can be cleaned in hot water or boiled in water, if need be, without injury thereto or effecting its perfect operation thereafter. The mode of adjustment of the float upon its support will be readily understood.

Modifications in detail may be resorted to without departing from the spirit of the invention or sacrificing any of its advantages.

What I claim as new is—

1. A spring-holder, combined with a float adjustably held thereon by frictional contact of the same, as set forth.

2. A spring-holder, combined with a float adjustably held thereon by frictional contact of the parts, the holder being passed through the float, and a stopper pivotally supported from the holder, as set forth.

3. The combination, with a float having a diametrical passage therethrough, of a holder of wire bent upon itself to form substantially parallel portions inserted in said passage and held to the float by frictional contact of the parts, and a stopper pendulously supported from the bent portion in said holder, substantially as specified.

In testimony whereof I affix my signature in presence of two witnesses.

PERLEY L. KIMBALL.

Witnesses:
PRESTON H. HADLEY,
JOSEPH S. WILLSON.